United States Patent [19]

Shimizu

[11] Patent Number: 5,266,804

[45] Date of Patent: Nov. 30, 1993

[54] SHADING ELIMINATION METHOD FOR IMAGE READ-OUT APPARATUSES

[75] Inventor: Hitoshi Shimizu, Kanagawa, Japan

[73] Assignee: Fuji Photo Film Co. Ltd., Kanagawa, Japan

[21] Appl. No.: 868,694

[22] Filed: Apr. 15, 1992

[30] Foreign Application Priority Data

Apr. 18, 1991 [JP] Japan .................. 3-086902

[51] Int. Cl.$^5$ ............................. G01N 23/04
[52] U.S. Cl. ..................... 250/584; 358/163
[58] Field of Search ............. 250/327.2 A, 327.2 D,
250/327.2 E, 327.2 F, 327.2 G, 484.1 B, 487.1;
358/163, 461

[56] References Cited

U.S. PATENT DOCUMENTS

| | | |
|---|---|---|
| 4,258,264 | 3/1981 | Kotera et al. |
| 4,346,295 | 8/1982 | Tanaka et al. |
| 4,734,783 | 3/1988 | Horikawa . |
| 4,763,201 | 8/1988 | Sakamoto ........................ 358/461 |
| 4,864,134 | 9/1989 | Hosoi et al. |
| 4,885,467 | 12/1989 | Horikawa ........................ 358/163 |
| 4,985,629 | 1/1991 | Horikawa . |
| 5,028,783 | 7/1991 | Arakawa . |

FOREIGN PATENT DOCUMENTS 56-11395  2/1981  Japan .

Primary Examiner—Paul M. Dzierzynski
Assistant Examiner—Richard Hanig
Attorney, Agent, or Firm—Sughrue, Mion, Zinn, Macpeak & Seas

[57] ABSTRACT

A surface, on which uniform information has been recorded, is two-dimensionally scanned with light beam deflected by a rotating polygon mirror having reflecting surfaces. Light radiated out of the scanned surface is photoelectrically detected, and groups of reference signal components for correcting purposes are thereby obtained, each group corresponding to one reflecting surface. Each time the groups of reference signal components for correcting purposes, which groups correspond to the whole reflecting surfaces, are obtained while the rotating polygon mirror rotates one turn, an averaging process is carried out on these groups of reference signal components for correcting purposes. A group of correction signal components are generated from a group of reference signal components for correcting purposes, which have been obtained from the averaging process. After an image signal is detected from a surface having an image recorded thereon, each group of image signal components of the image signal corresponding to one reflecting surface are corrected with the group of correction signal components. An averaging process is then carried out on the groups of image signal components of the image signal, which correspond to the whole reflecting surfaces and which have thus been corrected.

5 Claims, 3 Drawing Sheets

FIG. 2

SHADING ELIMINATION METHOD FOR IMAGE READ-OUT APPARATUSES

BACKGROUND OF THE INVENTION

1. Field of the Invention

This invention relates to a method for compensating for fluctuations in an image signal caused by the nonuniformity in how a photoelectric read-out means detects light radiated out of a recording medium (i.e., light reflected by the recording medium, light which has passed through the recording medium, or light emitted by the recording medium), or the like, in an image read-out apparatus. In the image read-out apparatus, the recording medium, on which an image has been recorded, is exposed to a light beam, and light carrying information about the image is thereby radiated out of the recording medium. The light, which has been radiated out of the recording medium, is photoelectrically detected and converted into an image signal, which is made up of a series of image signal components representing the image recorded on the recording medium.

2. Description of the Prior Art

Image read-out apparatuses, wherein a recording medium, on which an image has been recorded, is exposed to a light beam, and light radiated out of the recording medium (i.e. light reflected by the recording medium, light which has passed through the recording medium, or light emitted by the recording medium) is detected in order to allow the image to be read out, have heretofore been used as, for example, scanners for plate making and input means for computers and facsimiles. The image read-out apparatuses are also used as radiation image read-out apparatuses in radiation image recording and reproducing systems, wherein stimulable phosphor sheets are used, as proposed by the applicant in, for example, U.S. Pat. Nos. 4,258,264 and 4,346,295 and Japanese Unexamined Patent Publication No. 56(1981)-11395.

Specifically, when certain kinds of phosphors are exposed to radiation such as X-rays, $\alpha$-rays, $\beta$-rays, $\gamma$-rays, cathode rays, or ultraviolet rays, they store part of the energy of the radiation. Then, when the phosphor, which has been exposed to the radiation, is exposed to stimulating rays, such as visible light, light is emitted by the phosphor in proportion to the amount of energy stored thereon during its exposure to the radiation. A phosphor exhibiting such properties is referred to as a stimulable phosphor. In the aforesaid radiation image read-out apparatuses, a sheet provided with a layer of the stimulable phosphor (hereinafter referred to as a stimulable phosphor sheet) is used. The stimulable phosphor sheet is first exposed to radiation, which has passed through an object, such as a human body, and a radiation image of the object is thereby stored on the stimulable phosphor sheet. The stimulable phosphor sheet, on which the radiation image has been stored, is then exposed to stimulating rays, which cause the stimulable phosphor sheet to emit light in proportion to the amount of energy stored thereon during its exposure to the radiation. The light emitted by the stimulable phosphor sheet upon stimulation thereof is photoelectrically detected and converted into an electric image signal.

In the image read-out apparatuses described above, a photoelectric read-out means is used to detect light which is radiated out of the recording medium when it is exposed to a light beam and which carries information about the image recorded on the recording medium. By way of example, the photoelectric read-out means is constituted of a comparatively small photomultiplier and a light guide member, one edge face of which is positioned along a main scanning line on a recording medium, and the other edge face of which is positioned such that it is in close contact with the light receiving face of the photomultiplier. Alternatively, the photoelectric read-out means is constituted of a long photomultiplier which is positioned along a main scanning line on a recording medium, as disclosed in, for example, U.S. Pat. No. 4,864,134, or a line sensor which is positioned along a main scanning line.

However, with the image read-out apparatuses described above, the image signal generated by the photoelectric read-out means fluctuates, due to nonuniformity in how the photoelectric read-out means detects the light radiated out of the recording medium (i.e. light reflected by the recording medium, light which has passed through the recording medium, or light emitted by the recording medium). This nonuniformity is caused by nonuniformity in how the light is guided by the light guide member along the main scanning direction, or by nonuniformity in the sensitivity of the long photomultiplier along the main scanning direction. In cases where the aforesaid nonuniformities cause the efficiency, with which the light is detected, to worsen (i.e. cause shading to occur), it becomes impossible to accurately detect the image which was recorded on the recording medium.

In order to eliminate the aforesaid problems, as disclosed in, for example, U.S. Pat. No. 4,734,783, the applicant has proposed apparatuses for eliminating shading, wherein the characteristics of the shading are detected in advance, and the image signal, the sensitivity of the photomultiplier, or the like, is corrected in accordance with the position at which the light beam scans in the main scanning direction. Thereby, adverse effects from shading are eliminated.

In the image read-out apparatuses, rotating polygon mirrors which have a plurality of reflecting surfaces may be used as the light deflectors. A rotating polygon mirror is advantageous over a galvanometer mirror in that the speed at which the light beam is deflected can be increased, which allows an image read-out operation to be carried out quickly.

However, the rotating polygon mirror has problems in that the reflectivity fluctuates among the reflecting surfaces and the inclination with respect to the rotation axis of the rotating polygon mirror and the distance therefrom differ among the reflecting surfaces. Also, the speed at which the rotating polygon mirror is rotated fluctuates periodically, so that the speed at which the light beam is deflected differs among the reflecting surfaces of the rotating polygon mirror. As a result, the intensity of light radiated out of a surface, which is being scanned with the light beam, differs from what it should be. These problems cause the characteristics of the shading to fluctuate, and adverse effects from the shading cannot be eliminated accurately with the shading elimination methods disclosed in, for example, U.S. Pat. No. 4,734,783.

Accordingly, the applicant proposed in, for example, U.S. Pat. Nos. 4,985,629 and 5,028,783, methods for eliminating adverse effects from shading due to fluctuations among reflecting surfaces of a rotating polygon mirror, or the like, in an image read-out apparatus utilizing the rotating polygon mirror.

However, with the proposed shading elimination methods for an image read-out apparatus utilizing a rotating polygon mirror, the operation for eliminating the adverse effects from shading is carried out for each of the reflecting surfaces of the rotating polygon mirror. Therefore, a very large number of correction values must be used during the operations for eliminating the adverse effects from shading. Also, the reflecting surface of the rotating polygon mirror, which is deflecting the light beam, must be detected such that it may be clear which correction values correspond to which reflecting surface. Accordingly, the hardware and software functions for carrying out the elimination of adverse effects from shading cannot be kept simple.

SUMMARY OF THE INVENTION

The primary object of the present invention is to provide a shading elimination method for an image read-out apparatus, wherein the number of correction signal components representing correction values, which are required to eliminate adverse effects from shading, is kept small.

Another object of the present invention is to provide a shading elimination method for an image read-out apparatus, with which adverse effects from shading are eliminated with simple hardware and software functions.

A further object of the present invention is to provide a shading elimination method for an image read-out apparatus, with which adverse effects from shading are eliminated accurately, and an image signal accurately representing an image recorded on a surface to be scanned is obtained.

The present invention provides a shading elimination method for an image read-out apparatus, wherein a light beam is reflected and deflected by a rotating polygon mirror, which has a plurality of reflecting surfaces, a surface which has an image recorded thereon is two-dimensionally scanned with the deflected light beam, and light which is radiated out of the scanned surface and which carries information about the image is detected and converted into an image signal by a photoelectric read-out means, the image signal being made up of a series of image signal components representing the image, the shading elimination method comprising the steps of:

i) two-dimensionally scanning a surface, on which uniform information has been recorded, with the light beam, which has been deflected by said rotating polygon mirror, ii) detecting light radiated out of said surface, on which uniform information has been recorded and which is being scanned, by said photoelectric read-out means, a plurality of groups of reference signal components for correcting purposes being thereby obtained from said photoelectric read-out means, each of which groups corresponds to one of said reflecting surfaces of said rotating polygon mirror, iii) each time a plurality of groups of reference signal components for correcting purposes, which groups correspond to the whole reflecting surfaces of said rotating polygon mirror, are obtained during a single period during which said rotating polygon mirror rotates one turn, carrying out an averaging process on the plurality of said groups of said reference signal components for correcting purposes, a group of reference signal components for correcting purposes being thereby obtained from said averaging process, iv) generating a group of correction signal components from said group of said reference signal components for correcting purposes, which have been obtained from said averaging process, v) correcting each of a plurality of groups of the image signal components of said image signal, each of which groups corresponds to one of said reflecting surfaces of said rotating polygon mirror, in accordance with said group of said correction signal components, and vi) carrying out an averaging process on the plurality of said groups of said image signal components of said image signal, which groups correspond to the whole reflecting surfaces of said rotating polygon mirror and which have thus been corrected.

With the shading elimination method for an image read-out apparatus in accordance with the present invention, a plurality of groups of reference signal components for correcting purposes, each of which groups corresponds to one of the reflecting surfaces of the rotating polygon mirror, are detected from the surface, on which uniform information has been recorded. Each time a plurality of groups of reference signal components for correcting purposes, which groups correspond to the while reflecting surfaces of the rotating polygon mirror, are obtained during a single period during which the rotating polygon mirror rotates one turn, the averaging process is carried out on the plurality of these groups of the reference signal components for correcting purposes. A group of reference signal components for correcting purposes is thereby obtained from the averaging process. Thereafter, a group of correction signal components are generated from the group of the reference signal components for correcting purposes, which have been obtained from the averaging process. As a result, a single group of the correction signal components are obtained with respect to a single period of rotation of the rotating polygon mirror. Therefore, the number of the correction signal components, which are required to eliminate adverse effects from shading, can be kept small.

Also, with the shading elimination method for an image read-out apparatus in accordance with the present invention, a group of image signal components of the image signal, from which the adverse effects from shading have been eliminated, are obtained with respect to each period during which the rotating polygon mirror rotates one turn. Therefore, no operation need be carried out for detecting the reflecting surface of the rotating polygon mirror, which is deflecting the light beam, such that it may be clear which group of correction signal components correspond to which reflecting surface. Accordingly, the hardware and software functions for carrying out the elimination of adverse effects from shading can be kept simple.

Additionally, with the shading elimination method for an image read-out apparatus in accordance with the present invention, adverse effects from shading can be eliminated accurately, and an image signal can be obtained which accurately represents the image recorded on the surface to be scanned.

DRAWINGS

FIG. 1 is a schematic view showing an example of an image read-out apparatus wherein an embodiment of FIG. 2 is an explanatory view showing how the adverse effects from shading are eliminated by the embodiment shown in FIG. 1, and FIG. 3 is an explanatory view showing picture elements on a stimulable phosphor sheet.

DESCRIPTION OF THE PREFERRED EMBODIMENTS

The present invention will hereinbelow be described in further detail with reference to the accompanying drawings.

Figure 1:
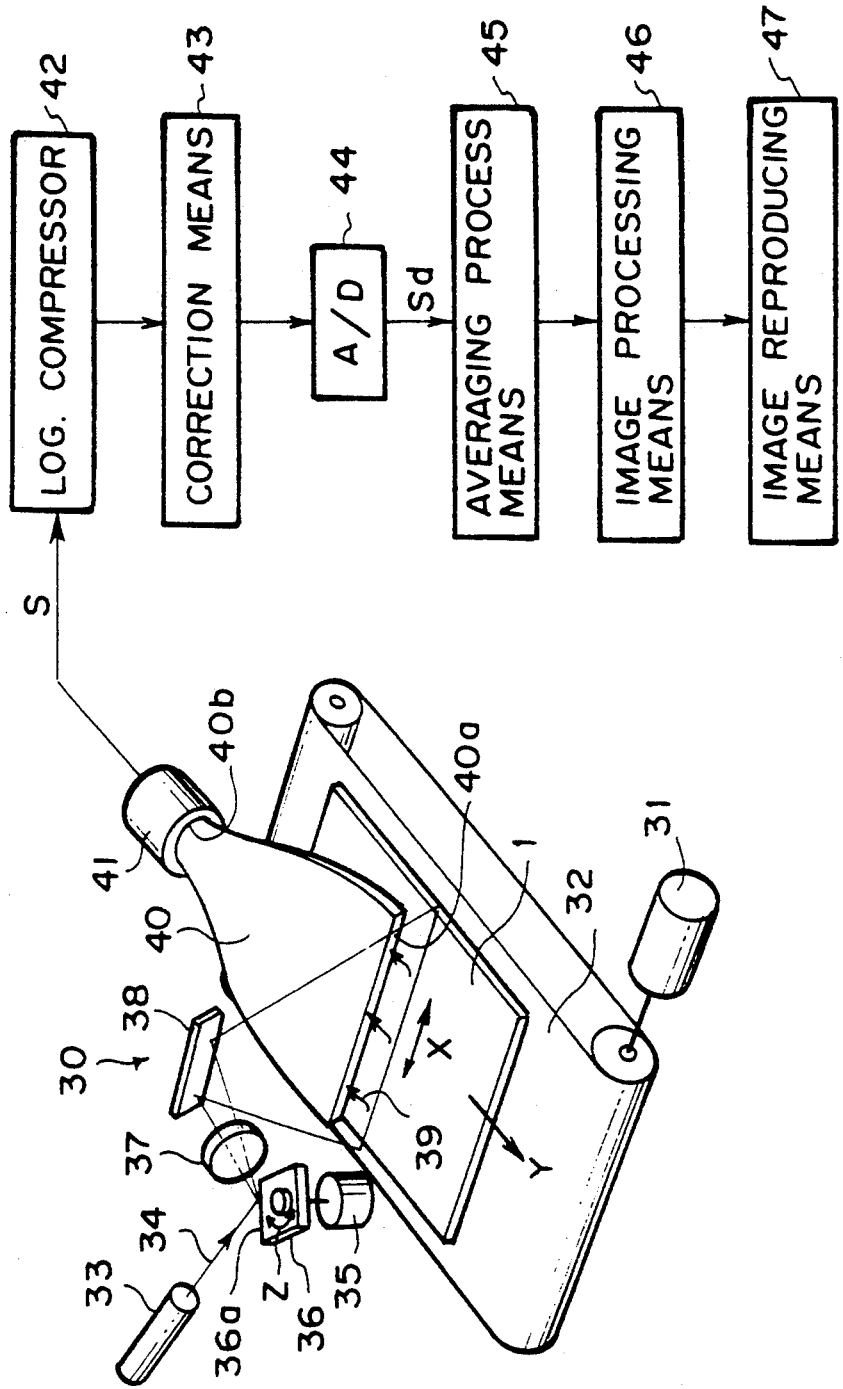

FIG. 1 is a schematic view showing an example of an image read-out apparatus wherein an embodiment of the shading elimination method in accordance with the present invention is employed. By way of example, this image read-out apparatus is constituted as a radiation image read-out apparatus for detecting (reading out) light emitted by a stimulable phosphor sheet, on which a radiation image has been stored, in proportion to the amount of energy stored thereon during its exposure to radiation. The radiation image read-out apparatus is used in a radiation image recording and reproducing system, wherein the stimulable phosphor sheet is utilized, as disclosed in, for example, U.S. Pat. No. 4,258,264 and Japanese Unexamined Patent Publication No. 56(1981)-11395.

In a radiation image recording apparatus (not shown), a stimulable phosphor sheet 1 is exposed to radiation, which has passed through an object. A radiation image of the object is thereby stored on the stimulable phosphor sheet 1. Thereafter, as illustrated in FIG. 1, the stimulable phosphor sheet 1, on which the radiation image has been stored, is set at a predetermined position in a radiation image read-out apparatus 30.

The stimulable phosphor sheet 1, which has been set at the predetermined position, is then conveyed by a sheet conveyance means 32 in a sub-scanning direction indicated by the arrow Y. The sheet conveyance means 32 may be constituted of an endless belt, or the like, and is operated by a motor 31. A laser beam 34, which serves as stimulating rays, is produced by a laser beam source 33. The laser beam 34 is reflected and deflected by four reflecting surfaces 36a, 36a, 36a, 36a of a rotating polygon mirror 36, which is quickly rotated by a motor 35 in the direction indicated by the arrow Z. The laser beam 34 then passes through a converging lens 37, which may be constituted of an f lens, or the like. The direction of the optical path of the laser beam 34 is then changed by a mirror 38, and the laser beam 34 impinges upon the stimulable phosphor sheet 1 and scans it in a main scanning direction indicated by the arrow X, which direction is approximately normal to the sub-scanning direction indicated by the arrow Y. When the stimulable phosphor sheet 1 is exposed to the laser beam 34, the exposed portion of the stimulable phosphor sheet 1 emits light 39 in an amount proportional to the amount of energy stored thereon during its exposure to the radiation. The emitted light 39 is guided by a light guide member 40 and photoelectrically detected by a photomultiplier 41, which serves as a photodetector. The light guide member 40 is made from a light guiding material such as an acrylic plate and has a linear light input face 40a, positioned so that it extends along the main scanning line on the stimulable phosphor sheet 1, and a ring-shaped light output face 40b, positioned so that it is in close contact with a light receiving face of the photomultiplier 41. The emitted light 39, which has entered the light guide member 40 at its light input face 40a, is guided through repeated total reflection inside of the light guide member 40, emanates from the light output face 40b, and is received by the photomultiplier 41. In this manner, the amount of the emitted light 39, which amount represents the radiation image, is detected by the photomultiplier 41.

An analog output signal S generated by the photomultiplier 41 is logarithmically compressed by a logarithmic compressor 42. The compressed analog output signal S is then fed into a correction means 43, which eliminates adverse effects from shading in the manner which will be described later. Thereafter, the analog output signal S is sampled with a predetermined scale factor by an A/D converter 44. In this manner, a digital read-out image signal Sd is obtained. An averaging process means 45 carries out an averaging process on a plurality of groups of image signal components of the digital read-out image signal Sd, which groups were obtained when the rotating polygon mirror 36 rotated one turn. The digital read-out image signal Sd, which has been obtained from the averaging process means 45, is then fed into an image processing means 46. The image processing means 46 carries out such processing, such as gradation processing and frequency response processing, on the digital read-out image signal Sd. The processed image signal is fed into an image reproducing means 47, which may be constituted of a cathode ray tube (CRT) display device, an optical scanning recording apparatus, or the like. The read-out image signal Sd represents the amount of light emitted by the stimulable phosphor sheet 1. Therefore, from the read-out image signal Sd, the radiation image which was stored on the stimulable phosphor sheet 1 can be reproduced as a visible image by the image reproducing means 47. Instead of being immediately fed into the image reproducing means 47, the read-out image signal Sd may be temporarily stored on a storage medium, such as a magnetic disk or a magnetic tape.

As described above, in the aforesaid image read-out apparatus, shading is often caused by nonuniformity in the intensity of the laser beam 34, nonuniformity in how the light emitted by the stimulable phosphor sheet 1 is guided and detected, or the like. If shading arises, the level of the analog output signal S generated by the photomultiplier 41 will vary for different portions of the stimulable phosphor sheet 1, even when the same amount of energy is stored on said portions during their exposure to radiation. Therefore, in such cases, the image which was stored on the stimulable phosphor sheet 1 cannot be read out accurately. Also, in cases where a rotating polygon mirror 36 is utilized as the light deflector, the reflectivity fluctuates among the reflecting surfaces 36a, 36a, 36a, 36a, and the angle with respect to the rotation axis of the rotating polygon mirror 36 (i.e. the surface inclination) and the distance from the rotation axis differ among the reflecting surfaces 36a, 36a, 36a, 36a. Therefore, in such cases, the characteristics of the shading fluctuate with respect to the reflecting surfaces 36a, 36a, 36a, which deflect the laser beam 34. How the adverse effects from shading are eliminated will be described hereinbelow.

Figure 2:
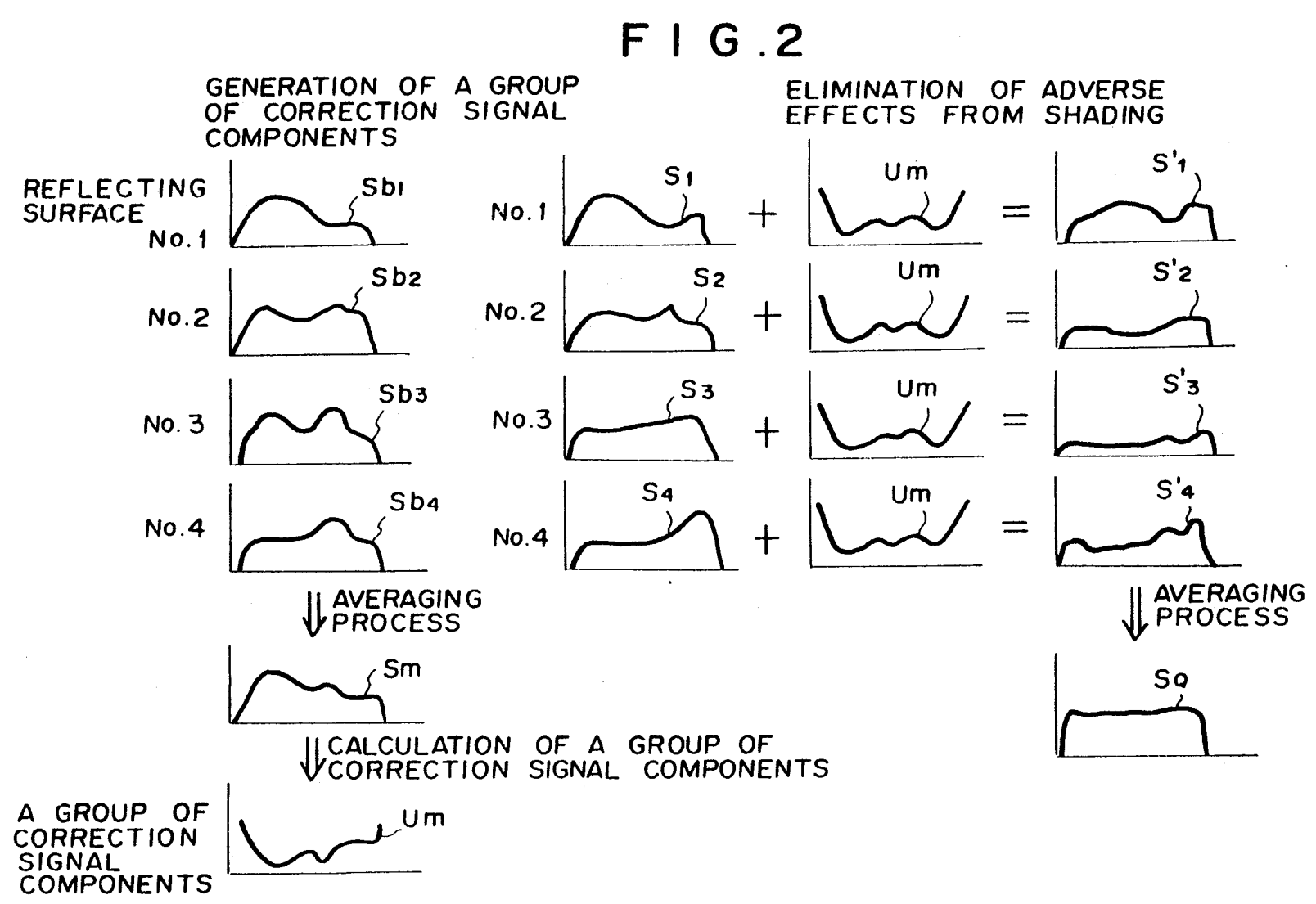

FIG. 2 is an explanatory view showing how the adverse effects from shading are eliminated by the embodiment shown in FIG. 1.

As an aid in facilitating the explanation, the four reflecting surfaces 36a, 36a, 36a, 36a of the rotating polygon mirror 36 will hereinbelow be referred to as reflecting surface Nos. 1, 2, 3, and 4. While the rotating polygon mirror 36 rotates one turn, the laser beam 34 scans along four main scanning lines, and four groups of image signal components S1, S2, S3, and S4 are obtained which groups correspond respectively to the reflecting surface Nos. 1, 2, 3, and 4.

Figure 3:
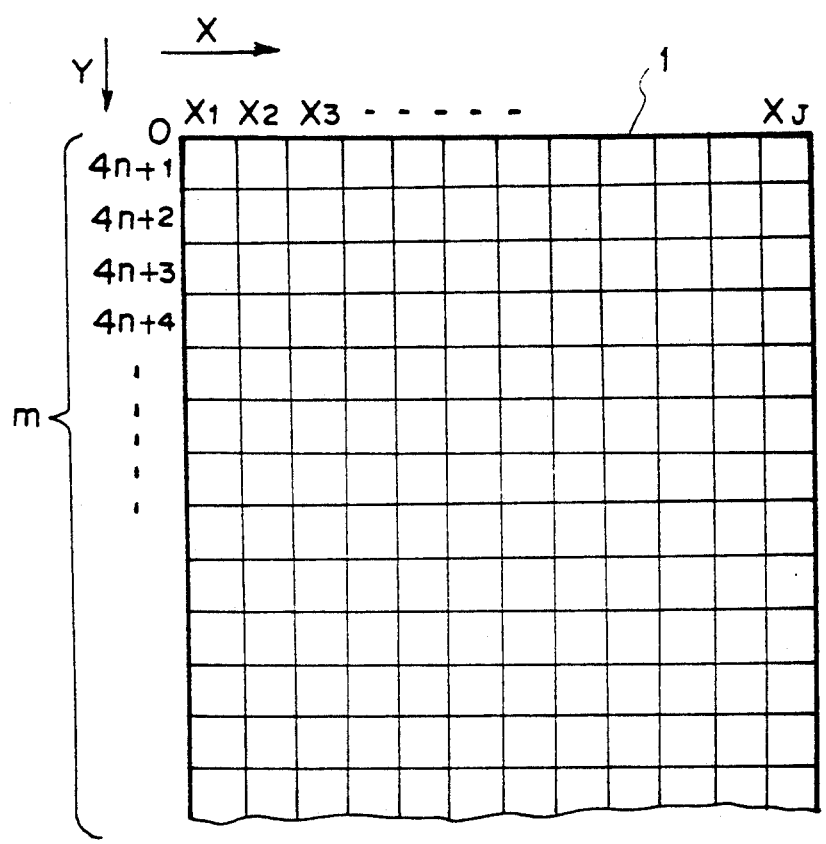

As shown in FIG. 3, j number of picture element columns X1, X2, X3, ..., Xj are arrayed along the main scanning direction X on the stimulable phosphor sheet 1. Also, the rotating polygon mirror 36 has four reflecting surfaces 36a, 36a, 36a, 36a. Therefore, m number of picture element rows arrayed along the sub-scanning direction Y are classified in accordance with which reflecting surface 36a deflected the laser beam 34 for that row. The rows are divided into four groups: 4n+1, 4n+2, 4n+3, and 4n+4, wherein n denotes 0 and the positive integers. Accordingly, when a point O shown in FIG. 3 is taken as an origin, the picture elements can be expressed with respect to coordinates j and n as X(j,4n+1), X(j,4n+2), X(j,4n+3), and X(j,4n+4), wherein j denotes the positive integers, and n denotes 0 and the positive integers.

First, in order to yield information necessary for correcting purposes, a stimulable phosphor sheet is uniformly exposed to radiation, and uniform information is thereby stored on the stimulable phosphor sheet. This stimulable phosphor sheet is employed as a reference. An image signal is then detected from the stimulable phosphor sheet, and no correction is carried out on the image signal. In this manner, as illustrated in FIG. 2, image signal components of the image signal, i.e. four groups of reference signal components for correcting purposes Sb1, Sb2, Sb3, and Sb4, are obtained when the rotating polygon mirror 36 rotates one turn. The averaging process means 45 carries out an averaging process on the four groups of the reference signal components for correcting purposes Sb1, Sb2, Sb3, and Sb4, and a group of mean reference signal components Sm are thereby obtained. Specifically, the value of each mean reference signal component is calculated from the values of four reference signal components for correcting purposes corresponding to each set of four picture elements, which are arrayed along the sub-scanning direction Y and which are scanned during each period during which the rotating polygon mirror 36 rotates one turn. The calculation is carried out with the formula $$Sm(j,n) = \frac{S(j,4n+1) + S(j,4n+2) + S(j,4n+3) + S(j,4n+4)}{4} \quad (1)$$

The calculation with Formula (1) is carried out for j from j=1 to j=J. In this manner, the group of the mean reference signal components Sm are obtained. Thereafter, a mean value Sm' of the values of the group of the mean reference signal components Sm is calculated. The mean value Sm' serves as a reference value during the calculation of values of a group of correction signal components Um. Specifically, the mean value Sm' of the values of the group of the mean reference signal components Sm, which correspond to each row of picture elements Sm(1,n), Sm(2,n), Sm(3,n), . . . , Sm(J,n) along the main scanning direction X, is calculated with the formula $$Sm' = \frac{\sum_{j=1}^{J} Sm(j,n)}{J} \quad (2)$$

Thereafter, values of differences between the mean value Sm' of the group of the mean reference signal components Sm and the values of the group of the mean reference signal components Sm are calculated. The signal components representing the values of the differences, which have thus been calculated, are employed as the group of the correction signal components Um. Specifically, a calculation is made with the formula $$U(j,n) = Sm(j,n) - Sm' \quad (3)$$

for each of the picture elements of j=1 to j=J in the group for a single period during which the rotating polygon mirror 36 rotates one turn. From such calculations, the group of the correction signal components Um are obtained. The information about the group of the correction signal components Um is stored in the image read-out apparatus and used during the correction of image signals detected from stimulable phosphor sheets, on which radiation images have been stored.

How the image signal detected from the stimulable phosphor sheet 1, on which the radiation image has been stored, is corrected will be described hereinbelow.

The correction means 43 adds the values of the group of the correction signal components Um to each of the four groups of the image signal components S1, S2, S3, and S4, which have been obtained while the rotating polygon mirror 36 rotates one turn. Specifically, for the group of the image signal components representing the picture elements arrayed along the row 4n+1, a calculation represented by the formula $$S'(j,4n+1) = S(j,4n+1) + U(j,n) \quad (4)$$

is carried out for j from j=1 to j=J. Such a calculation is also carried out for the groups of the image signal components representing the picture elements arrayed along the rows 4n+2, 4n+3, and 4n+4. In this manner, four groups of image signal components S1', S2', S3', and S4' are obtained from the addition of the values of the group of the correction signal components Um.

Thereafter, the averaging process means 45 carries out an averaging process on the four groups of the image signal components S1', S2', S3', and S4', which have been obtained from the addition of the values of the group of the correction signal components Um. Specifically, the calculation represented by the formula $$S_Q(j,n) = \frac{S'(j,4n+1) + S'(j,4n+2) + S'(j,4n+3) + S'(j,4n+4)}{4} \quad (5)$$

is carried out for j from j=1 to j=J.

A group of image signal components SQ are thus obtained from the averaging process. The group of the image signal components SQ are free of any fluctuation in the image signal level due to shading and accurately represent the image information, which was stored on the stimulable phosphor sheet 1.

The operations described above are carried out for all of the sets of the image signal components, each of which sets corresponds to four rows of the picture elements and is obtained during a single period during which the rotating polygon mirror 36 rotates one turn. Thereafter, the image processing means 46 carries out image processing on an image signal composed of the image signal components SQ, which have thus been corrected. The image signal obtained from the image processing is fed into the image reproducing means 47 and used during the reproduction of a visible image. In this manner, a visible radiation image having good image quality free of adverse effects from shading can be reproduced.

With the embodiment described above, in cases where the nonuniformity in the image signal due to shading is approximately 15%, the nonuniformity in the image signal can be reduced to approximately 1% by carrying out the aforesaid correction for eliminating the adverse effects from the shading.

In the aforesaid embodiment, the correction is carried out on the analog signal, which has been compressed logarithmically. Alternatively, the correction may be carried out on the digital signal, which has been obtained from the A/D conversion.

Also, in the aforesaid embodiment, the four reflecting surfaces 36a, 36a, 36a, 36a of the rotating polygon mirror 36 are numbered as reflecting surface Nos. 1, 2, 3, and 4. The four reflecting surfaces 36a, 36a, 36a, 36a are numbered only as an aid in facilitating the explanation. With the shading elimination method for an image read-out apparatus in accordance with the present invention, the group of the correction signal components Um are obtained for each period during which the rotating polygon mirror 36 rotates one turn. Therefore, no operation need be carried out for detecting the reflecting surface 36a of the rotating polygon mirror 36, which reflecting surface 36a is deflecting the laser beam 34, such that it may be clear which group of correction signal components Um correspond to which reflecting surface 36a.

Additionally, in the aforesaid embodiment, the rotating polygon mirror 36 having four reflecting surfaces 36a, 36a, 36a, 36a is employed. However, no limitation is imposed on the number of the reflecting surfaces. For example, a rotating polygon mirror having six reflecting surfaces may be employed. In such cases, when a group of correction signal components Um are to be obtained, the picture element rows arrayed along the sub-scanning direction Y on the stimulable phosphor sheet 1 may be divided into six groups: 6n+1, 6n+2, 6n+3, 6n+4, 6n+5, and 6n+6 wherein n denotes 0 and the positive integers.

The shading elimination method for an image read-out apparatus in accordance with the present invention is applicable not only to an apparatus wherein the amount of light emitted by a stimulable phosphor sheet 1 is detected, the amount of which emitted light is proportional to the amount of energy stored on the stimulable phosphor sheet 1 during its exposure to radiation, but also to any other image read-out apparatuses wherein light which has been reflected by a scanned surface and which carries information about the image recorded on said surface is detected, or wherein light which has passed through the scanned surface and which carries the information about the image recorded on said surface is detected.

What is claimed is:

1. A shading elimination method for an image read-out apparatus, wherein a light beam is reflected and deflected by a rotating polygon mirror, which has a plurality of reflecting surfaces, a surface which has an image recorded thereon is two-dimensionally scanned with the deflected light beam, and light which is radiated out of the scanned surface and which carries information about the image is detected and converted into an image signal by a photoelectric read-out means, the image signal being made up of a series of image signal components representing the image, the shading elimination method comprising the steps of:
  i) two-dimensionally scanning a surface, on which uniform information has been recorded, with the light beam, which has been deflected by said rotating polygon mirror,
  ii) detecting light radiated out on which uniform information has been recorded and which is being scanned, by said photoelectric read-out means, a plurality of groups of reference signal components for correcting purposes being thereby obtained from said photoelectric read-out means, each of which groups corresponds to one of said reflecting surfaces of said rotating polygon mirror,
  iii) each time a plurality of groups of reference signal components for correcting purposes, which groups correspond to the whole reflecting surfaces of said rotating polygon mirror, are obtained during a single period during which said rotating polygon mirror rotates one turn, carrying out an averaging process on the plurality of said groups of said reference signal components for correcting purposes, a group of reference signal components for correcting purposes being thereby obtained from said averaging process,
  iv) generating a group of correction signal components from said group of said reference signal components for correcting purposes, which have been obtained from said averaging process,
  v) correcting each of a plurality of groups of the image signal components of said image signal, each of which groups corresponds to one of said reflecting surfaces of said rotating polygon mirror, in accordance with said group of said correction signal components, and
  vi) carrying out an averaging process on the plurality of said groups of said image signal components of said image signal, which groups correspond to the whole reflecting surfaces of said rotating polygon mirror and which have thus been corrected.

2. A method as defined in claim 1 wherein said surface which has an image recorded thereon is the surface of a stimulable phosphor sheet on which said image has been stored in the form of a radiation image, and said light which is radiated out of the scanned surface and which carries information about the image is light emitted by said stimulable phosphor sheet when said stimulable phosphor sheet is scanned with stimulating rays, which serve as said light beam, the amount of which emitted light is proportional to the amount of energy stored on said stimulable phosphor sheet during its exposure to radiation.

3. A method as defined in claim 2 wherein said stimulating rays are a laser beam.

4. A method as defined in claim 1 wherein said surface, on which uniform information has been recorded, is the surface of a stimulable phosphor sheet which has been uniformly exposed to radiation, and said light radiated out of said surface, on which uniform information has been recorded and which is being scanned, is light emitted by said stimulable phosphor sheet when said stimulable phosphor sheet is scanned with stimulating rays, which serve as said light beam, the amount of which emitted light is proportional to the amount of energy stored on said stimulable phosphor sheet during its exposure to radiation.

5. A method as defined in claim 4 wherein said stimulating rays are a laser beam.

* * * * *